United States Patent
Asayama et al.

(10) Patent No.: US 11,354,795 B2
(45) Date of Patent: Jun. 7, 2022

(54) DEPOSIT DETECTION DEVICE AND DEPOSIT DETECTION METHOD

(71) Applicant: DENSO TEN Limited, Kobe (JP)

(72) Inventors: Nobunori Asayama, Kobe (JP); Nobuhisa Ikeda, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 113 days.

(21) Appl. No.: 17/019,513

(22) Filed: Sep. 14, 2020

(65) Prior Publication Data
US 2021/0090236 A1 Mar. 25, 2021

(30) Foreign Application Priority Data
Sep. 20, 2019 (JP) .............................. JP2019-172214

(51) Int. Cl.
  *G06T 7/00* (2017.01)
  *B60R 16/03* (2006.01)
  *G06T 7/11* (2017.01)

(52) U.S. Cl.
  CPC ............ *G06T 7/0002* (2013.01); *B60R 16/03* (2013.01); *G06T 7/11* (2017.01); *G06T 2207/30252* (2013.01)

(58) Field of Classification Search
  CPC ............ G06T 2207/30252; G06T 7/11; G06T 7/0002; B60R 16/03
  See application file for complete search history.

(56) References Cited

U.S. PATENT DOCUMENTS

| | | | |
|---|---|---|---|
| 9,018,577 B2* | 4/2015 | Lu | B60Q 1/085 250/221 |
| 10,218,961 B2* | 2/2019 | Kishiwada | G06T 7/85 |
| 10,789,502 B2* | 9/2020 | Asayama | G06V 10/50 |
| 2015/0177512 A1* | 6/2015 | Hayakawa | B60S 1/56 348/148 |
| 2015/0201120 A1* | 7/2015 | Irie | G06V 20/584 348/148 |
| 2016/0055645 A1* | 2/2016 | Ito | G06V 20/52 382/103 |
| 2019/0268590 A1* | 8/2019 | Kato | G06T 7/001 |
| 2021/0088441 A1* | 3/2021 | Oki | G01N 21/4738 |
| 2021/0089809 A1* | 3/2021 | Asayama | G06T 7/0002 |

FOREIGN PATENT DOCUMENTS

JP  2018-176897 A  11/2018

* cited by examiner

Primary Examiner — Mia M Thomas
(74) Attorney, Agent, or Firm — Oliff PLC (57) ABSTRACT

A deposit detection device according to an embodiment includes a detection module and a storage processing module. The detection module detects a deposit region corresponding to a deposit adhering to an imaging device, based on brightness information of an image captured by the imaging device. The storage processing module stores deposit information on the deposit region in a storage unit that is nonvolatile, when an ignition power of a vehicle is turned off in a state in which the deposit region is detected. For an initial detection process after the ignition power is turned on, the detection module detects the deposit region based on the deposit information stored in the storage unit.

5 Claims, 8 Drawing Sheets

| PRESENCE/ABSENCE OF DEPOSIT REGION |
|---|
| DETERMINATION RESULT FOR EACH SMALL REGION |
| BRIGHTNESS AVERAGE MAXIMUM VALUE OF DEPOSIT REGION |
| BRIGHTNESS AVERAGE MINIMUM VALUE OF DEPOSIT REGION |
| BRIGHTNESS STANDARD DEVIATION MAXIMUM VALUE OF DEPOSIT REGION |
| BRIGHTNESS STANDARD DEVIATION MINIMUM VALUE OF DEPOSIT REGION |
| ⋮ |

DEPOSIT DETECTION DEVICE AND DEPOSIT DETECTION METHOD

CROSS-REFERENCE TO RELATED APPLICATION

This application is based upon and claims the benefit of priority of the prior Japanese Patent Application No. 2019-172214, filed on Sep. 20, 2019, the entire contents of which are incorporated herein by reference.

FIELD

The embodiments discussed herein are directed to a deposit detection device and a deposit detection method.

BACKGROUND

Conventionally, a deposit detection device is known that detects a region corresponding to a deposit adhering to a lens of an imaging device (hereinafter referred to as deposit region) based on a difference of brightness information in the past captured image and the present captured image, while a vehicle is moving (for example, refer to Japanese Laid-open Patent Publication No. 2018-176897).

Conventionally, information such as detection results is erased when the ignition power (IG) of a vehicle is turned off in a state in which a deposit region is detected. Because of this, for example, when the user turns on the IG without removing a deposit, a deposit region may fail to be detected until the vehicle starts moving. That is, conventionally, a deposit that actually adheres may fail to be detected in a period during which the vehicle is stopped immediately after the IG is turned on.

SUMMARY

A deposit detection device according to an embodiment includes a detection module and a storage processing module. The detection module detects a deposit region corresponding to a deposit adhering to an imaging device, based on brightness information of an image captured by the imaging device. The storage processing module stores deposit information on the deposit region in a storage unit that is nonvolatile, when an ignition power of a vehicle is turned off in a state in which the deposit region is detected. For an initial detection process after the ignition power is turned on, the detection module detects the deposit region based on the deposit information stored in the storage unit.

BRIEF DESCRIPTION OF DRAWINGS

FIG. 6 is a diagram illustrating the process in the control unit immediately after the IG is turned on;

DESCRIPTION OF EMBODIMENTS

Embodiments of a deposit detection device and a deposit detection method disclosed by the subject application will be described in detail below with reference to the accompanying drawings. It should be noted that the present invention is not limited by the embodiments illustrated below.

Figure 1:
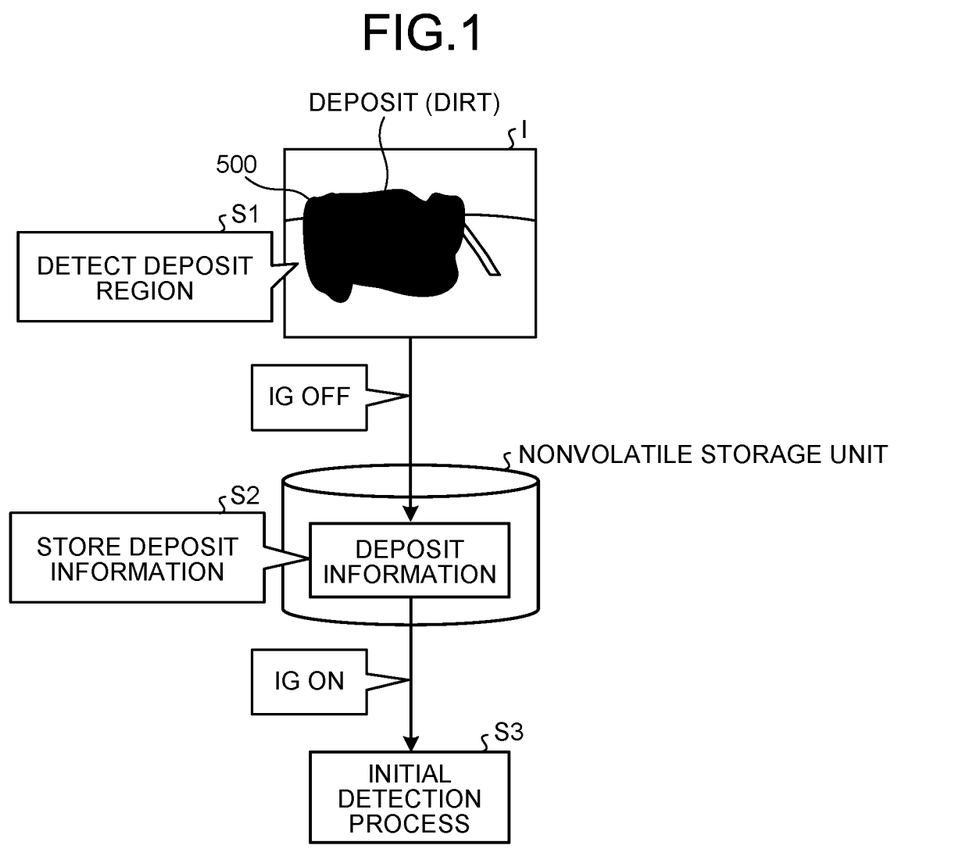
FIG. 1 is a diagram illustrating an overview of a deposit detection method according to an embodiment.

First, referring to FIG. 1, an overview of the deposit detection method according to an embodiment will be described. FIG. 1 is a diagram illustrating an overview of the deposit detection method according to the embodiment. The upper section of FIG. 1 illustrates an image I (hereinafter, captured image I) captured, for example, in a state in which a light-blocking deposit such as dirt adheres to a lens of a camera (an example of imaging device) mounted on a vehicle. When such a light-blocking deposit adheres, a deposit region in the captured image I is in a blocked-up shadow state. The light-blocking deposit includes dirt as well as insects and dust.

A conventional deposit detection method will now be described. Conventionally, a deposit region corresponding to a deposit adhering to a lens of an imaging device is detected based on a difference of brightness information in the past captured image and the present captured image, while a vehicle is moving.

In the conventional deposit detection method, however, information such as detection results is erased when the ignition power (IG) of the vehicle is turned off in a state in which a deposit region is detected. Because of this, when the user turns on the IG without removing a deposit, a deposit region may fail to be detected until the vehicle starts moving. That is, conventionally, a deposit that actually adheres may fail to be detected in a period during which the vehicle is stopped immediately after the IG is turned on.

Then, in the deposit detection method according to the embodiment, when the IG is turned off, information on a deposit is saved in a storage unit that is nonvolatile, and the saved information is used in an initial detection process immediately after the IG is turned on.

Specifically, in the deposit detection method according to the embodiment, first of all, a deposit region 500 corresponding to a deposit adhering to a lens of a camera that is an imaging device is detected based on brightness information of a captured image I (step S1). The deposit region 500 is detected in units of small regions into which a predetermined region is divided, which will be described later with reference to FIG. 3.

Subsequently, in the deposit detection method according to the embodiment, when the ignition power (hereinafter, IG) of the vehicle is turned off in a state in which the deposit region 500 is detected, a storing process of storing deposit information on the detected deposit region 500 in a storage unit that is nonvolatile (nonvolatile storage unit) is performed (step S2). The deposit information includes brightness information in the deposit region 500. The detail of the deposit information will be described later.

Subsequently, in the deposit detection method according to the embodiment, for an initial detection process after the IG is turned on, the deposit region is detected based on the deposit information stored in the nonvolatile memory (step S3).

For example, in the deposit detection method according to the embodiment, the deposit region 500 is detected if the brightness information of the captured image I in the initial process is within a range of the brightness information of the deposit region 500 stored as the deposit information. That is, it is detected that the deposit is not removed and is left in a period from turning-off to turning-on of the IG. Since the initial detection process uses the brightness information of a region corresponding to the deposit region 500 in the captured image I, whether there is a deposit can be detected even while the vehicle is stopped.

In this way, in the deposit detection method according to the embodiment, the deposit information is saved in the nonvolatile storage unit, whereby the deposit information that is information on the detection result can be prevented from being erased when the IG is turned off.

In the deposit detection method according to the embodiment, when the IG is turned on, the saved deposit information is read to perform the initial detection process, whereby the deposit region 500 can be detected even while the vehicle is stopped. The deposit detection method according to the embodiment therefore can detect a deposit with high accuracy.

Figure 2:
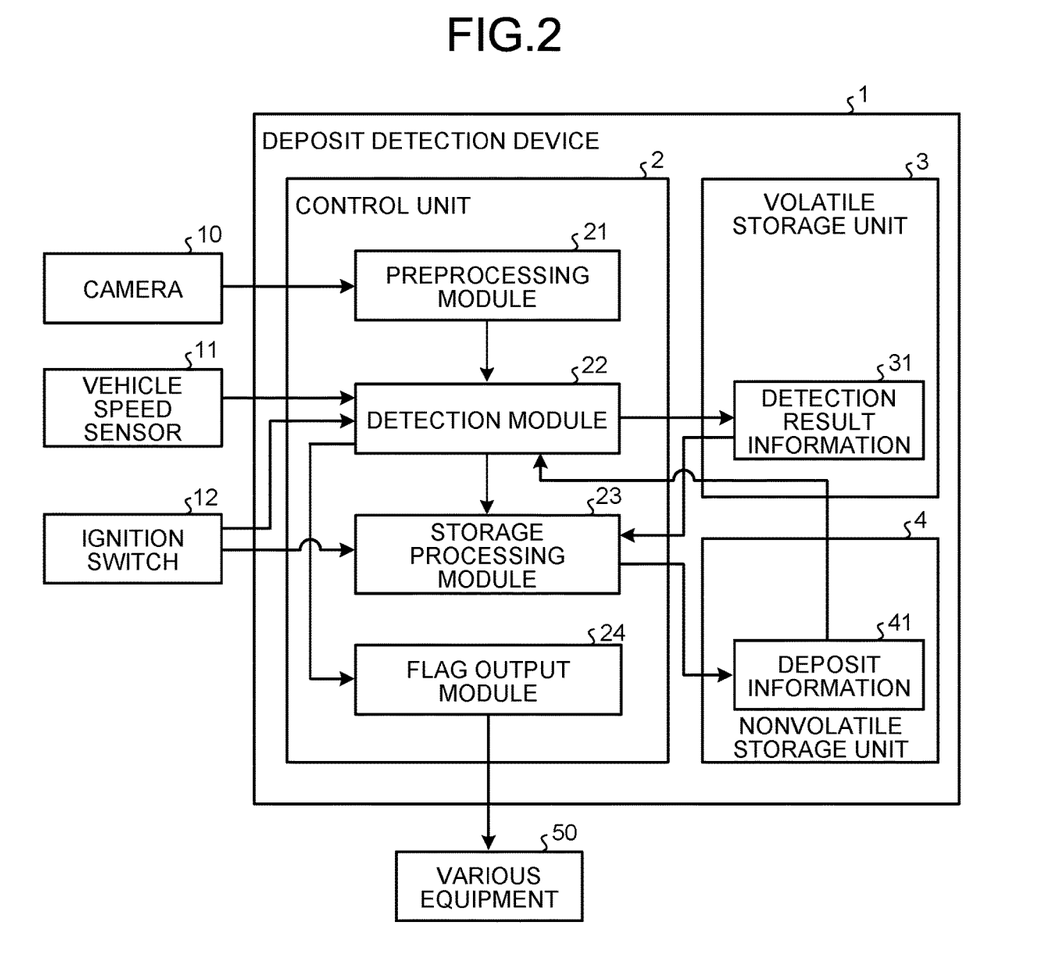
FIG. 2 is a block diagram illustrating a configuration of a deposit detection device according to the embodiment.

Referring now to FIG. 2, a configuration of a deposit detection device 1 according to an embodiment will be described. FIG. 2 is a block diagram illustrating the configuration of the deposit detection device 1 according to an embodiment. As illustrated in FIG. 2, the deposit detection device 1 according to an embodiment is connected with a camera 10, a vehicle speed sensor 11, an ignition switch 12, and various equipment 50. Although the deposit detection device 1 illustrated in FIG. 2 is a separate component from the camera 10 and the various equipment 50, the deposit detection device 1 may be integrated with at least one of the camera 10 and the various equipment 50.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front, back, left side, and right side of the vehicle can be captured, and output the captured images I to the deposit detection device 1.

The vehicle speed sensor 11 is a sensor that detects the speed of the vehicle. The vehicle speed sensor 11 outputs information on the detected vehicle speed to the deposit detection device 1.

The ignition switch 12 is a switch for switching on and off the ignition power of the vehicle. The ignition switch 12 notifies the deposit detection device 1 that the ignition power is turned off or turned on in accordance with the user's operation.

The various equipment 50 acquires the detection result from the deposit detection device 1 to perform a variety of control on the vehicle. The various equipment 50 includes, for example, a display device indicating that a deposit adheres to the lens of the camera 10 and notifies the user of an instruction to wipe off the deposit, a removal device that ejects fluid, gas, or the like toward the lens to remove the deposit, and a vehicle control device for controlling autonomous driving, for example.

As illustrated in FIG. 2, the deposit detection device 1 according to the embodiment includes a control unit 2, a volatile storage unit 3, and a nonvolatile storage unit 4. The control unit 2 includes a preprocessing module 21, a detection module 22, a storage processing module 23, and a flag output module 24. The volatile storage unit 3 stores therein detection result information 31. The nonvolatile storage unit 4 stores therein deposit information 41.

Here, the deposit detection device 1 includes, for example, a computer having a central processing unit (CPU), a read-only memory (ROM), a random-access memory (RAM), a flash memory, and an input-output port, and a variety of circuits.

The CPU of the computer reads and executes a computer program stored in the ROM, for example, to function as the preprocessing module 21, the detection module 22, the storage processing module 23, and the flag output module 24 of the control unit 2.

At least one or all of the preprocessing module 21, the detection module 22, the storage processing module 23, and the flag output module 24 of the control unit 2 may be configured by hardware such as an application specific integrated circuit (ASIC) and a field-programmable gate array (FPGA).

The volatile storage unit 3 corresponds to, for example, a RAM. The RAM can store therein the detection result information 31, information on a variety of computer programs, and the like. The nonvolatile storage unit 4 corresponds to a ROM or a flash memory. The ROM or the flash memory can store therein the deposit information 41, information on a variety of computer programs, and the like. The deposit detection device 1 may acquire the computer programs and a variety of information described above through another computer connected via a wired or wireless network or a portable recording medium.

The detection result information 31 stored in the volatile storage unit 3 is information on the deposit region 500 detected by the detection module 22 described later. The detail of the detection result information 31 will be described later with reference to FIG. 4.

The deposit information 41 stored in the nonvolatile storage unit 4 is information stored by the storage processing module 23 described later and is information on the deposit region 500 detected by the detection module 22. The detail of the deposit information 41 will be described later.

The preprocessing module 21 performs predetermined preprocessing on the captured image I captured by the camera 10.

Specifically, the preprocessing module 21 performs a pixel thinning process on the acquired captured image I and generates an image having a size smaller than the acquired image. The preprocessing module 21 also generates an integrated image of the sum and the sum of squares of pixel values in the pixels, based on the image subjected to the thinning process. As used herein, the pixel value is information corresponding to brightness or an edge of a pixel.

In this way, the deposit detection device 1 can accelerate calculation in the processes in the subsequent stages by performing the thinning process on the acquired image and generating the integrated image and can reduce the process time for detecting a deposit.

The preprocessing module 21 may perform a smoothing process for each pixel, using a smoothing filter such as an averaging filter. The preprocessing module 21 does not necessarily perform the thinning process and may generate an integrated image of the captured image I having the same size as that of the acquired image.

The preprocessing module 21 outputs the captured image I that is an integrated image to the detection module 22.

Figure 3:
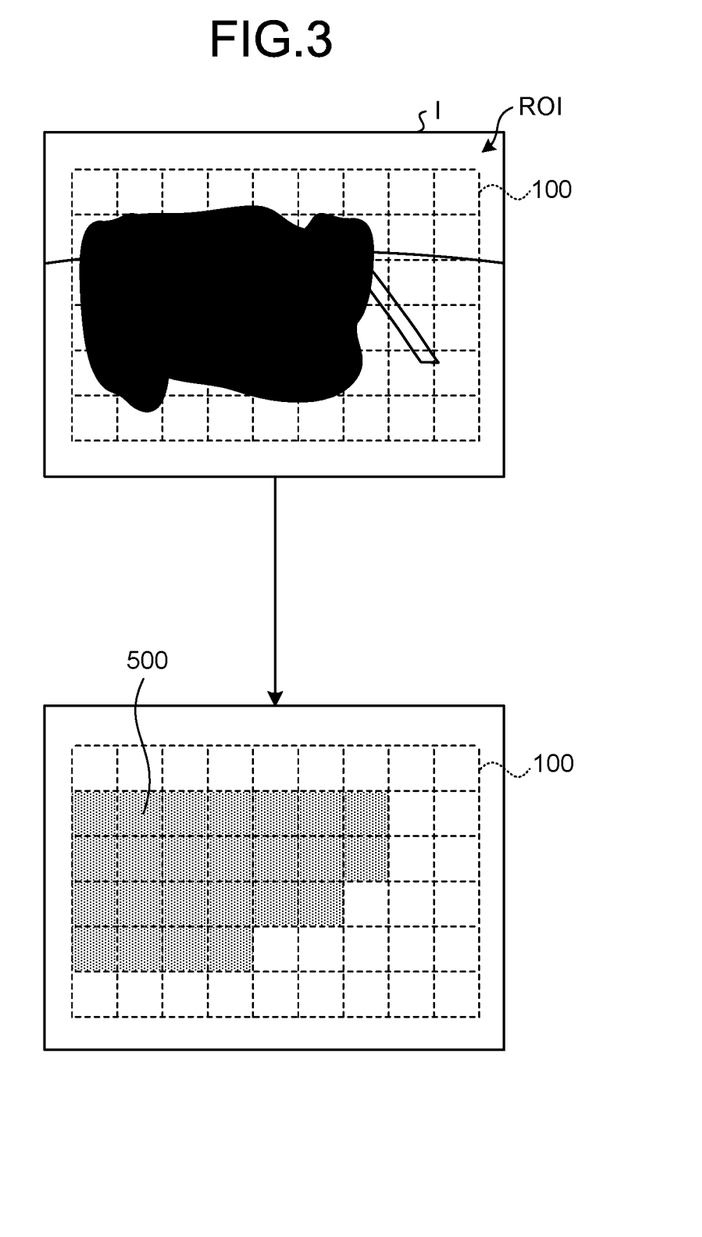
FIG. 3 is a diagram illustrating a process in a detection module.

The detection module 22 detects the deposit region 500 based on brightness information of the captured image I. Referring now to FIG. 3, a process in the detection module 22 will be described. FIG. 3 is a diagram illustrating the process in the detection module 22.

As illustrated in the upper section of FIG. 3, the detection module 22 first sets a predetermined region ROI and small regions 100 in the captured image I. The predetermined region ROI is a rectangular region preset according to the characteristics of the camera 10 and is a region, for example, excluding a vehicle body region and a housing region of the camera 10. The small regions 100 are rectangular regions formed by dividing the predetermined region ROI in the horizontal direction and the vertical direction. For example, each small region 100 is a region including 40×40 pixels, but the number of pixels included in the small region 100 can be set as desired.

Subsequently, the detection module 22 calculates brightness information indicating a feature amount of brightness for each small region 100. Specifically, the detection module 22 calculates an average value of brightness and a standard deviation of brightness as a feature amount, for each small region 100. The detection module 22 also calculates a feature amount of brightness (an average value of brightness and a standard deviation of brightness) in the entire predetermined region ROI.

Subsequently, the detection module 22 calculates a variation in feature amount of brightness in the captured images I from the past to the present. Specifically, the detection module 22 calculates, as a variation, a first difference that is a difference in average value of brightness in the small region 100 at the same position in the past and at present in the captured images I. That is, the detection module 22 calculates, as a variation, the first difference between the average value of brightness in the past and the average value of brightness at present for the corresponding small region 100.

The detection module 22 also calculates a second difference that is a difference in standard deviation of brightness in the small region 100 at the same position in the past and at present of the captured images I. That is, the detection module 22 calculates, as a variation, the second difference between the standard deviation of brightness in the past and the standard deviation of brightness at present for the corresponding small region 100.

Subsequently, the detection module 22 determines whether the brightness information satisfies a predetermined condition, for each individual small region 100. Specifically, the detection module 22 determines that the predetermined condition is satisfied when the variation in feature amount of brightness of the small region 100 in the captured images I in the past and at present falls within a predetermined threshold value range.

Subsequently, when the number of small regions 100 in which a count number indicating the number of times the brightness information satisfies the predetermined condition reaches a predetermined number or larger, is equal to or larger than a predetermined number, the detection module 22 detects the predetermined number of small regions 100 as a deposit region 500. That is, the detection module 22 detects, as a deposit region 500, a set of a predetermined number of small regions 100 in which the state of brightness information satisfying the predetermined condition continues a predetermined number of times or more in the captured images I of a few frames from the past to the present.

The detection module 22 outputs information indicating that the deposit region 500 is being detected to the storage processing module 23 and the flag output module 24. The detection module 22 also stores information on the detected deposit region 500 as the detection result information 31 in the volatile storage unit 3.

Figure 4:
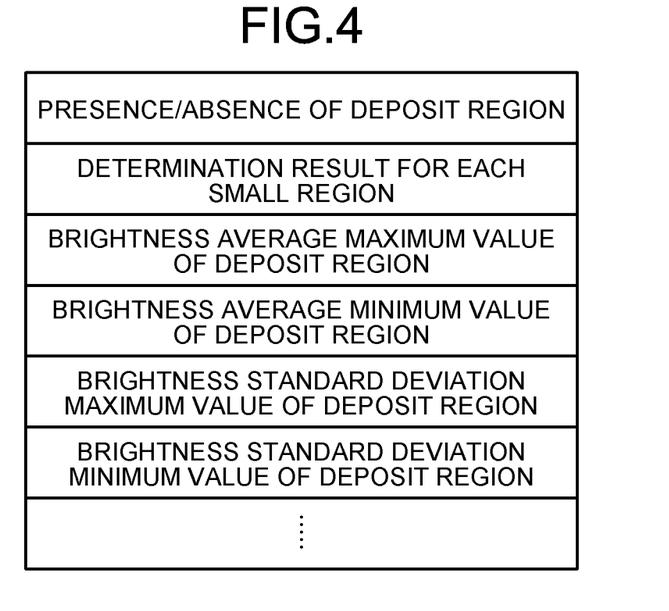
FIG. 4 is a diagram illustrating an example of detection result information.

Referring now to FIG. 4, the detection result information 31 will be described. FIG. 4 is a diagram illustrating an example of the detection result information 31.

As illustrated in FIG. 4, the detection result information 31 includes items such as "presence/absence of deposit region", "determination result for each small region", "brightness average maximum value of deposit region", "brightness average minimum value of deposit region", "brightness standard deviation maximum value of deposit region", and "brightness standard deviation minimum value of deposit region".

"Presence/absence of deposit region" is information indicating whether the deposit region 500 has been detected by the detection module 22. "Determination result for each small region" is information on the determination result of a small region 100 included in the deposit region 500 and includes, for example, information on the determination result such as being determined as a blocked-up shadow region such as dirt and being determined as a blurred region such as rain drops.

"Brightness average maximum value of deposit region" and "brightness average minimum value of deposit region" are information on the maximum value and the minimum value of average values of brightness for each small region 100 included in the deposit region 500.

"Brightness standard deviation maximum value of deposit region" and "brightness standard deviation minimum value of deposit region" are information on the maximum value and the minimum value of standard deviations of brightness for each small region 100 included in the deposit region 500.

The detection result information 31 may include information such as an average value of brightness and a standard deviation of brightness of the entire predetermined region ROI, in addition to the information described above.

For the initial detection process immediately after the IG is turned on, the detection module 22 performs a detection process for the deposit region 500, using the deposit information 41 stored in the nonvolatile storage unit 4 as an initial value, which will be described with reference to FIG. 6.

Returning to FIG. 2, the storage processing module 23 is described. The storage processing module 23 stores the deposit information 41 on the deposit region 500 in the nonvolatile storage unit 4 when the ignition power (IG) of the vehicle is turned off in a state in which the deposit region 500 is detected.

Specifically, the storage processing module 23 stores the deposit information 41 in the nonvolatile storage unit 4 when information indicating that the deposit region 500 is being detected is acquired from the detection module 22 and information that the ignition power is turned off is acquired from the ignition switch 12.

The deposit information 41 is, for example, information including part or the whole of the detection result information 31. That is, the deposit information 41 includes information such as "brightness average maximum value of deposit region", "brightness average minimum value of deposit region", "brightness standard deviation maximum value of deposit region", and "brightness standard deviation minimum value of deposit region" in the detection result information 31.

That is, when the IG is turned off, the storage processing module 23 reads the detection result information 31 stored in the volatile storage unit 3 and writes the read detection result information 31 as the deposit information 41 into the nonvolatile storage unit 4.

The storage processing module 23 is not limited to a module of what is called programmed I/O (PIO) by which the detection result information 31 in the volatile storage unit 3 is read and written as the deposit information 41 into the nonvolatile storage unit 4, and may employ the direct memory access (DMA) method by which information is directly stored in the nonvolatile storage unit 4 from the volatile storage unit 3.

Returning to FIG. 2, the flag output module 24 is described. The flag output module 24 outputs a deposit flag ON to the various equipment 50 when the deposit region 500 is being detected by the detection module 22. On the other hand, the flag output module 24 outputs a deposit flag OFF to the various equipment 50 when the deposit region is not being detected by the detection module 22.

Figure 5:
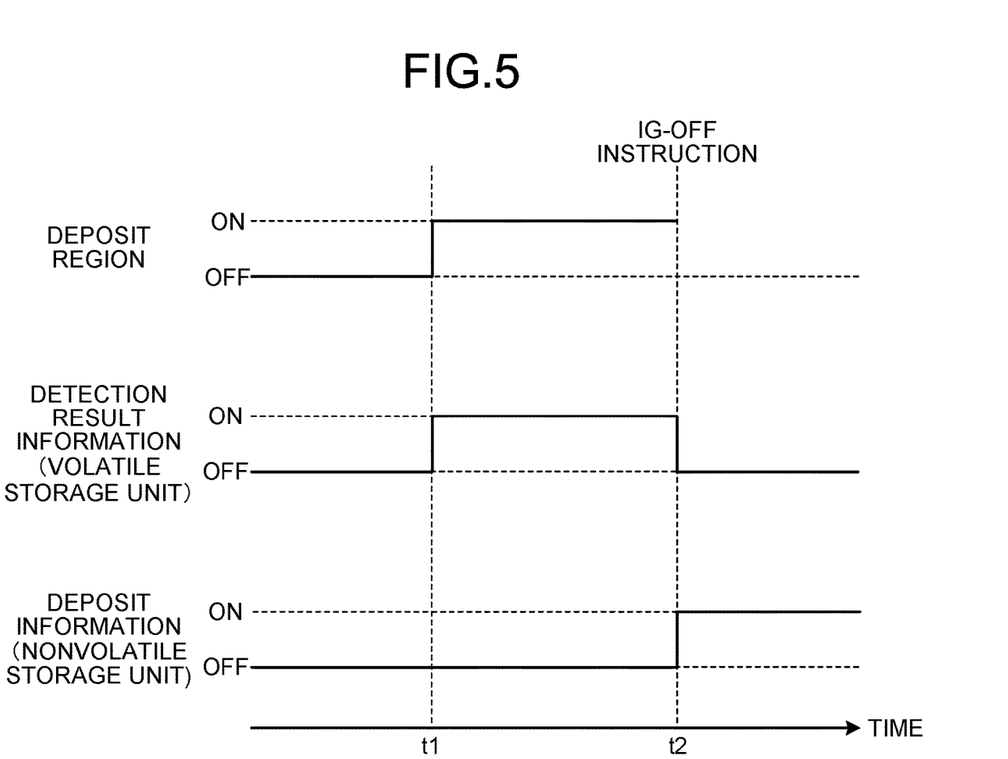
FIG. 5 is a diagram illustrating a process in a control unit immediately before an IG is turned off.
Figure 6:
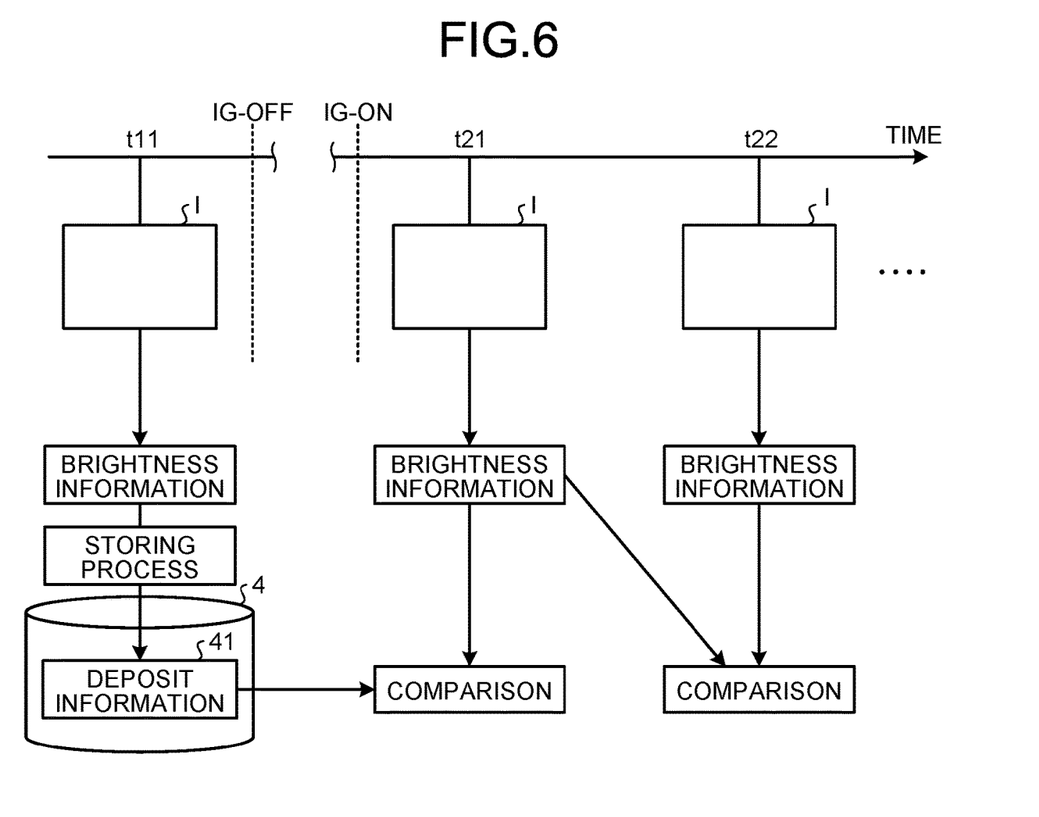

Referring now to FIG. 5 and FIG. 6, a process in the control unit 2 before and after the IG is turned off or on will be specifically described. FIG. 5 is a diagram illustrating the process in the control unit 2 immediately before the IG is turned off. FIG. 6 is a diagram illustrating the process in the control unit 2 immediately after the IG is turned on.

First referring to FIG. 5, the process in the control unit 2 immediately before the IG is turned off is described. In FIG. 5, it is assumed that, at time t1, the deposit region 500 is detected by the detection module 22, and at time t2, an instruction to turn off the IG is acquired.

Upon detecting the deposit region 500 at time t1, the detection module 22 starts storing the detection result information 31 in the volatile storage unit 3. The detection result information 31 is continuously updated in a period in which the deposit region 500 is being detected.

In the period from time t1 to time t2, the storage processing module 23 does not perform the storing process of storing the deposit information 41. That is, in the period from time t1 to time t2, the deposit information 41 is not stored in the nonvolatile storage unit 4. This configuration can reduce the number of times of writing into the nonvolatile storage unit 4 and can prolong the life of the nonvolatile storage unit 4.

Then, when an instruction to turn off the IG is acquired at time t2, the storage processing module 23 saves part or the whole of the detection result information 31 of the deposit region 500 detected from the captured image I immediately before time t2, as the deposit information 41 of the deposit region 500, in the nonvolatile storage unit 4.

Thus, even when the detection result information 31 in the volatile storage unit 3 is erased (OFF illustrated in FIG. 5) due to turning off of the IG after time t2, the detection result information 31 can be left as the deposit information 41 in the nonvolatile storage unit 4 and therefore can be used for the detection process immediately after the IG is turned on.

Referring now to FIG. 6, the process in the control unit 2 immediately after the IG is turned on is described. In FIG. 6, it is assumed that the brightness information and the like of the deposit region 500 detected from the captured image I at time t11 immediately before the IG is turned off are stored as the deposit information 41 in the nonvolatile storage unit 4.

As illustrated in FIG. 6. the storage processing module 23 detects the deposit region 500 based on the result of comparison between the brightness information of the captured image I captured initially after the IG is turned on and the deposit information 41 stored in the nonvolatile storage unit 4.

Specifically, first, the storage processing module 23 reads the deposit information 41 stored in the nonvolatile storage unit 4 and outputs the read deposit information 41 to the detection module 22, at time t21 after the IG is turned on. The detection module 22 calculates brightness information for each small region 100 of the captured image I captured at time t21.

The detection module 22 then compares the deposit information 41 acquired from the storage processing module 23 with the brightness information of the small region 100 of the captured image I at time t21. Specifically, the detection module 22 makes a comparison between the brightness information of the deposit region 500 (time t11) based on the deposit information 41 acquired from the storage processing module 23 and the brightness information of the small region 100 (time t21) at the same position as the deposit region 500. That is, the detection module 22 uses the deposit information 41 as an initial value in the initial detection process immediately after the IG is turned on.

Then, when the brightness information calculated from the captured image I at time t21 is within a range of the brightness information in the deposit information 41, the detection module 22 determines that the deposit region 500 detected at time t11 is not removed and is left in the captured image I at time t21.

For example, the detection module 22 detects the deposit region 500 when the feature amount of brightness of the small region 100 at time t21 is within a range of the maximum value and the minimum value of the feature amount of brightness in the deposit information 41.

On the other hand, when the brightness information calculated from the captured image I at time t21 is not within a range of the brightness information in the deposit information 41, the detection module 22 determines that the deposit region 500 detected at time t11 has been removed in the captured image I at time t21. The detection module 22 may identify that the deposit region 500 has been finally removed when it is continuously determined that the deposit region 500 has been removed.

In this way, the deposit region 500 is detected based on the result of comparison between the brightness information of the captured image I captured initially after the IG is turned on and the deposit information 41 stored in the nonvolatile storage unit 4, whereby a deposit can be detected early immediately after the IG is turned on.

In addition, the maximum value and the minimum value of the feature amount of brightness in the deposit region 500 are stored as the deposit information 41, whereby the initial detection process after the IG is turned on can be performed with high accuracy.

Subsequently, at time t22, the detection module 22 detects the deposit region 500 based on the brightness information calculated at the preceding time t21. Specifically, the detection module 22 compares the brightness information calculated from the captured image I captured at time t22 with the brightness information calculated at the preceding time t21 and, if the variation (difference) of the brightness information is within a predetermined range, detects the deposit region 500 continuously at time t22.

In this way, for the detection process after the initial detection process (time t21), the detection module 22 detects the deposit region 500 based on the brightness information of the captured image I (time t21) previously captured and the brightness information of the captured image I (time t22) captured this time, whereby the deposit can be detected with high accuracy continuously even after the IG is turned on.

Figure 7:
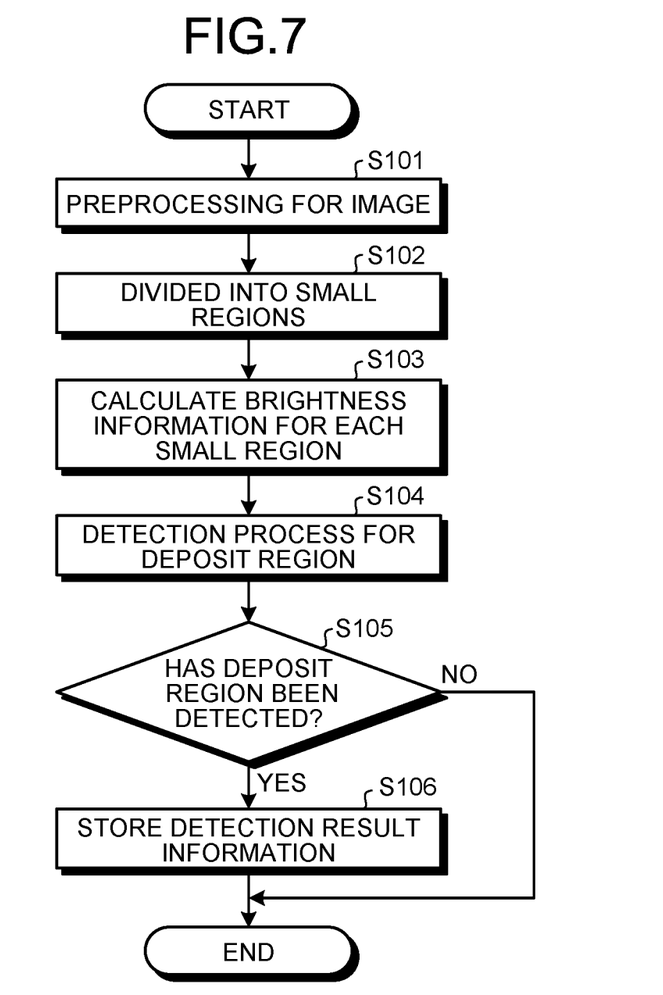
FIG. 7 is a flowchart illustrating a procedure of a detection process performed by the deposit detection device according to the embodiment.
Figure 8:
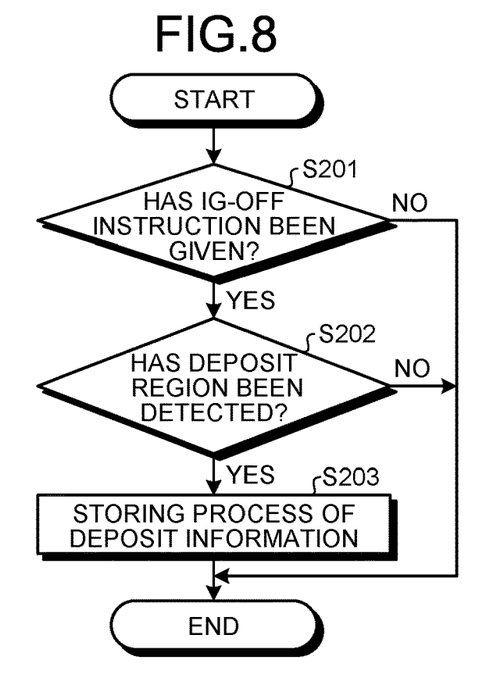
FIG. 8 is a flowchart illustrating a procedure of a storing process performed by the deposit detection device according to the embodiment.
Figure 9:
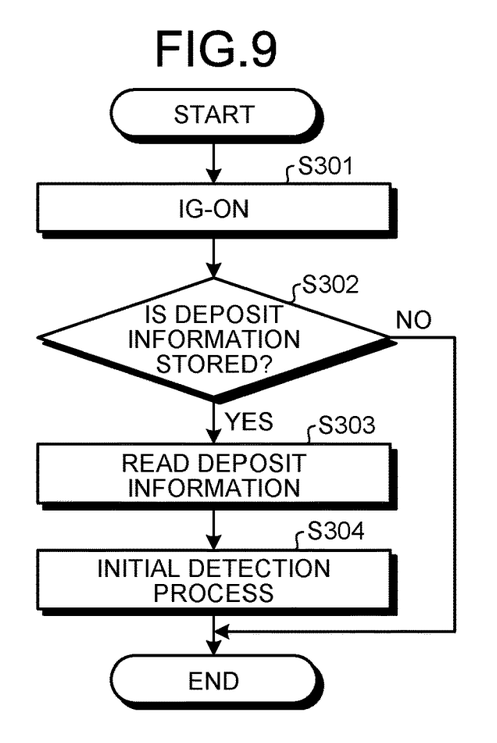
FIG. 9 is a flowchart illustrating a procedure of an initial detection process performed by the deposit detection device according to the embodiment.

Referring now to FIG. 7 to FIG. 9, a procedure of a process performed by the deposit detection device 1 according to the embodiment will be described. FIG. 7 is a flowchart illustrating the procedure of the detection process performed by the deposit detection device 1 according to the embodiment. FIG. 8 is a flowchart illustrating the procedure of the storing process performed by the deposit detection device 1 according to the embodiment. FIG. 9 is a flowchart illustrating the procedure of the initial detection process performed by the deposit detection device 1 according to the embodiment.

First, referring to FIG. 7, the detection process performed by the deposit detection device 1 according to the embodiment will be described.

As illustrated in FIG. 7, the preprocessing module 21 performs preprocessing on the acquired captured image I (step S101). As used herein, the preprocessing is a process of performing the gray-scale process and the thinning process and thereafter generating an integrated image based on pixel values of the reduced image.

Subsequently, the detection module 22 divides a predetermined region ROI in the captured image I into small regions 100 (step S102).

Subsequently, the detection module 22 calculates brightness information indicating a feature amount of brightness for each small region (step S103). The feature amount of brightness is, for example, an average value of brightness and a standard deviation of brightness.

Subsequently, the detection module 22 performs the detection process (excluding the initial detection process) for the deposit region 500, based on the calculated brightness information (step S104).

Subsequently, the detection module 22 determines whether the deposit region 500 has been detected (step S105).

If the deposit region 500 has been detected (Yes at step S105), the detection module 22 stores the detection result information 31 on the deposit region 500 in the volatile storage unit 3 (step S106) and terminates the process.

On the other hand, if the deposit region 500 is not detected at step S105 (No at step S105), the detection module 22 terminates the process. That is, if the deposit region 500 is not detected, the detection module 22 does not perform the process of storing the detection result information 31 in the volatile storage unit 3.

Referring now to FIG. 8, the storing process performed by the deposit detection device 1 according to the embodiment will be described.

First, the storage processing module 23 determines whether an instruction to turn off the IG has been given (step S201).

If the instruction to turn off the IG has been given (Yes at step S201), the storage processing module 23 determines whether the deposit region 500 is being detected by the detection module 22 (step S202).

If the deposit region 500 is being detected by the detection module 22 (Yes at step S202), the storage processing module 23 performs the storing process of storing the detection result information 31 as the deposit information 41 (step S203) and terminates the process.

On the other hand, if the instruction to turn off the IG is not given (No at step S201) or if the deposit region 500 is not being detected by the detection module 22 (No at step S202), the storage processing module 23 terminates the process.

Referring now to FIG. 9, the initial detection process performed by the deposit detection device 1 according to the embodiment will be described.

First, the storage processing module 23 acquires that the IG has been turned on (step S301).

Subsequently, the storage processing module 23 determines whether the deposit information 41 is stored in the nonvolatile storage unit 4 (step S302).

If the deposit information 41 is stored in the nonvolatile storage unit 4 (Yes at step S302), the storage processing module 23 reads and outputs the deposit information 41 to the detection module 22 (step S303).

Subsequently, the detection module 22 performs the initial detection process based on the deposit information 41 acquired from the storage processing module 23 (step S304) and terminates the process.

On the other hand, if the deposit information 41 is not stored in the nonvolatile storage unit 4 at step S302 (No at step S302), the detection module 22 terminates the process.

As described above, the deposit detection device 1 according to the embodiment includes the detection module 22 and the storage processing module 23. The detection module 22 detects a deposit region 500 corresponding to a deposit adhering to an imaging device, based on brightness information in a captured image I captured by the imaging device (camera 10). The storage processing module 23 stores deposit information 41 on the deposit region 500 in the nonvolatile storage unit 4, when an ignition power of a vehicle is turned off in a state in which the deposit region 500 is detected. For an initial detection process after the ignition power is turned on, the detection module 22 detects the deposit region 500 based on the deposit information 41 stored in the nonvolatile storage unit 4. With this configuration, a deposit can be detected with high accuracy.

In the foregoing embodiment, the captured image I captured by a camera mounted on a vehicle is used. However, the captured image I may be, for example, a captured image I captured by a security camera or a camera installed on a street lamp. That is, the captured image I may be any captured image captured by a camera with a lens to which a deposit may adhere.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deposit detection device comprising:
   a detection module configured to detect a deposit region corresponding to a deposit adhering to an imaging device, based on brightness information of an image captured by the imaging device; and
   a storage processing module configured to store deposit information on the deposit region in a storage unit that is nonvolatile, when an ignition power of a vehicle is turned off in a state in which the deposit region is detected, wherein
   for an initial detection process after the ignition power is turned on, the detection module detects the deposit region based on the deposit information stored in the storage unit.

2. The deposit detection device according to claim 1, wherein the detection module detects the deposit region based on a result of comparison between the brightness information of an image captured initially after the ignition power is turned on and the deposit information stored in the storage unit.

3. The deposit detection device according to claim 1, wherein
the detection module calculates the brightness information for each of small regions into which a predetermined region in the image is divided and, when number of the small regions in which the brightness information satisfies a predetermined deposit condition is equal to or larger than a predetermined number, detects the small regions as the deposit region, and
the storage processing module stores in the storage unit the deposit information including information on a maximum value and a minimum value of feature amounts of brightness of the small regions included in the deposit region.

4. The deposit detection device according to claim 1, wherein for a detection process after the initial detection process, the detection module detects the deposit region, based on the brightness information of an image previously captured and the brightness information of an image captured this time.

5. A deposit detection method comprising:
detecting a deposit region corresponding to a deposit adhering to an imaging device, based on brightness information of an image captured by the imaging device; and
storing deposit information on the deposit region in a storage unit that is nonvolatile, when an ignition power of a vehicle is turned off in a state in which the deposit region is detected,
wherein at the detecting, for an initial detection process after the ignition power is turned on, the deposit region is detected based on the deposit information stored in the storage unit.

\* \* \* \* \*